(12) United States Patent
Willer et al.

(10) Patent No.: US 12,440,908 B2
(45) Date of Patent: Oct. 14, 2025

(54) ASPHALT SAW BLADE

(71) Applicant: Weldco Fabrication and Design, LLC, Vernal, UT (US)

(72) Inventors: Rhadd Vernon Willer, Grand Junction, CO (US); Jacob Robert Willer, Vernal, UT (US)

(73) Assignee: Weldco Fabrication and Design, LLC, Vernal, UT (US)

( * ) Notice: Subject to any disclaimer, the term of this patent is extended or adjusted under 35 U.S.C. 154(b) by 295 days.

(21) Appl. No.: 18/359,353

(22) Filed: Jul. 26, 2023

(65) Prior Publication Data

US 2025/0033128 A1    Jan. 30, 2025

(51) Int. Cl.
  *B23D 61/02* (2006.01)
  *B28D 1/12* (2006.01)
(52) U.S. Cl.
  CPC ........... *B23D 61/021* (2013.01); *B28D 1/121* (2013.01)
(58) Field of Classification Search
  CPC ............................. B23D 61/021; B28D 1/121
  See application file for complete search history.

(56) References Cited

U.S. PATENT DOCUMENTS

| | | | | |
|---|---|---|---|---|
| 5,596,825 | A  * | 1/1997 | Von Schalscha | E02F 3/962 172/701.3 |
| 9,487,933 | B2 * | 11/2016 | Clift | E02F 9/2866 |
| 2008/0202488 | A1* | 8/2008 | Kim | B24D 99/005 125/15 |
| 2014/0373693 | A1* | 12/2014 | Gosamo | B28D 1/121 451/542 |
| 2015/0020418 | A1* | 1/2015 | Clift | B28D 1/045 76/112 |
| 2016/0376767 | A1* | 12/2016 | Miller | B28D 7/02 37/94 |
| 2020/0222999 | A1* | 7/2020 | Curry, Jr. | B28D 1/188 |
| 2022/0032383 | A1* | 2/2022 | Willer | B23D 61/123 |
| 2025/0050539 | A1* | 2/2025 | Willer | B28D 1/121 |

* cited by examiner

*Primary Examiner* — Sean M Michalski
(74) *Attorney, Agent, or Firm* — Kirton McConkie; Brian Tucker

(57) ABSTRACT

A unique design is provided that may increase the strength and performance and extend the life of a saw blade, particularly when used to cut asphalt. The saw blade may include a main body forming teeth, opposing outer plates secured to each tooth and a cutter secured to each tooth between the respective outer plates. Each tooth can form a recessed section in which a base of cutter main body may be positioned. The outer plates may extend over the recessed section. The outer plates may also extend over a notch formed in a rear face of a rear portion of each tooth. Legs of the outer plates may extend radially inward overtop the main body of the saw blade. A front portion of each tooth and the respective outer plates may extend frontward beyond the respective cutter.

20 Claims, 6 Drawing Sheets

ASPHALT SAW BLADE

CROSS-REFERENCE TO RELATED APPLICATIONS

N/A

BACKGROUND

It is oftentimes necessary to cut asphalt such as to repair potholes or other road damage, to install utilities, to run fiber optic cables, etc. Because asphalt is softer than other paving materials such as concrete, a specialized saw blade is typically used. Such "asphalt saw blades" typically use a strong metal to bond small diamonds to the saw blade, or more particularly, along the sides and radial edge of teeth that extend around the circumference of the saw blade's main body.

As the saw blade passes through asphalt, the diamonds grind away the asphalt. The strong metal that bonds the diamonds to the saw blade allows the diamonds to chip rather than breaking off. This ensures that a fresh cutting edge will exist on the diamonds for a prolonged period. Eventually, the diamonds will wear completely down or break off at which point the asphalt saw blade will need to be replaced.

BRIEF SUMMARY

The present invention extends to saw blades. More particularly, embodiments of the present invention encompass a unique design of a saw blade that can increase the strength and performance and extend the life of the asphalt saw blade, particularly when used to cut asphalt.

In some embodiments, the present invention may be implemented as a saw blade that includes a main body having a plurality of teeth, opposing outer plates coupled to each tooth, and a cutter coupled to each tooth and the respective outer plates. Each tooth may have a front portion, a rear portion and a middle portion. The middle portion may extend radially from a circular inner shape of the main body to a lesser extent than the front portion and the rear portion to form a recessed section. The opposing outer plates may extend radially beyond the middle portion of the respective tooth. The cutter may include a cutter main body, a cutter plate, and one or more cutting elements. The cutter main body may have a base that is positioned within the recessed section of the respective tooth.

In some embodiments, the rear portion of the tooth may extend radially from the circular inner shape of the main body to a greater extent than the front portion of the tooth.

In some embodiments, a rear face of the cutter main body may be positioned against the rear portion of the tooth.

In some embodiments, the cutter plate may be secured to a front face of the cutter main body, and the cutter main body and the cutter plate may form one or more receiving portions in which the one or more cutting elements are positioned.

In some embodiments, the one or more cutting elements may extend frontward overtop the front portion of the tooth.

In some embodiments, the rear portion of the tooth may form a rear face of the tooth and the rear face may include a notch.

In some embodiments, the opposing outer plates may cover sides of the notch in the rear face of the rear portion of the tooth.

In some embodiments, each outer plate may include opposing legs that extend radially inward onto the main body.

In some embodiments, the base of the cutter main body may include beveled edges.

In some embodiments, the one or more cutting elements may comprise two cutting elements.

In some embodiments, each of the outer plates may include a front portion and a rear portion. The front portion of the outer plate may have a radial edge that aligns with a radial edge of the front portion of the tooth. The rear portion of the outer plate may have a radial edge that aligns with a radial edge of the rear portion of the tooth.

In some embodiments, the front portion of the outer plate may form a front face of the outer plate that aligns with a front face of the tooth and the rear portion of the outer plate may form a rear face of the outer plate that aligns with a rear face of the tooth.

In some embodiments, the present invention may be implemented as a saw blade that includes a main body having a plurality of teeth, opposing outer plates that are coupled to each tooth, and a cutter that is coupled to each tooth. Each outer plate may have a front portion and a rear portion. The front portion of the outer plate may form a front face of the outer plate that aligns with a front face of the tooth. The rear portion of the outer plate may form a rear face of the outer plate that aligns with a rear face of the tooth. Each cutter may include a cutter main body, a cutter plate, and one or more cutting elements. The cutter main body may be positioned against the rear portion of the opposing outer plates and spaced rearward from the front face of the outer plates.

In some embodiments, each of the outer plates may include opposing legs that extend radially inward from the respective tooth and onto the main body.

In some embodiments, each tooth may form a recessed section within which a base of the respective cutter main body is positioned.

In some embodiments, the recessed section may be positioned between the opposing outer plates.

In some embodiments, the cutter plate and the one or more cutting elements may extend frontward from the cutter main body overtop the front portion of the respective outer plates.

In some embodiments, the present invention may be implemented as a saw blade that includes a main body having a plurality of teeth, opposing outer plates that are coupled to each tooth, and a cutter that is coupled to each tooth and the respective outer plates. Each tooth may have a front portion, a rear portion and a middle portion. Each outer plate may have a rear portion that aligns with the rear portion of the respective tooth. The cutter may include a cutter main body, a cutter plate, and one or more cutting elements. A radial edge of the cutter main body may align with a radial edge of the rear portion of the respective tooth and with a radial edge of the rear portion of the respective outer plates.

In some embodiments, the front portion of the main body and a front portion of each of the respective outer plates may extend frontward beyond the respective cutter.

In some embodiments, the middle portion of each tooth may form a recessed section of the respective tooth. A base of the respective cutter main body may be positioned within the recessed section.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In the context of this application, the term "frontward" and "rearward" are used relative to the intended rotational direction of the saw blade. A frontward component will be positioned rotationally frontward of a rearward component.

Figure 1:
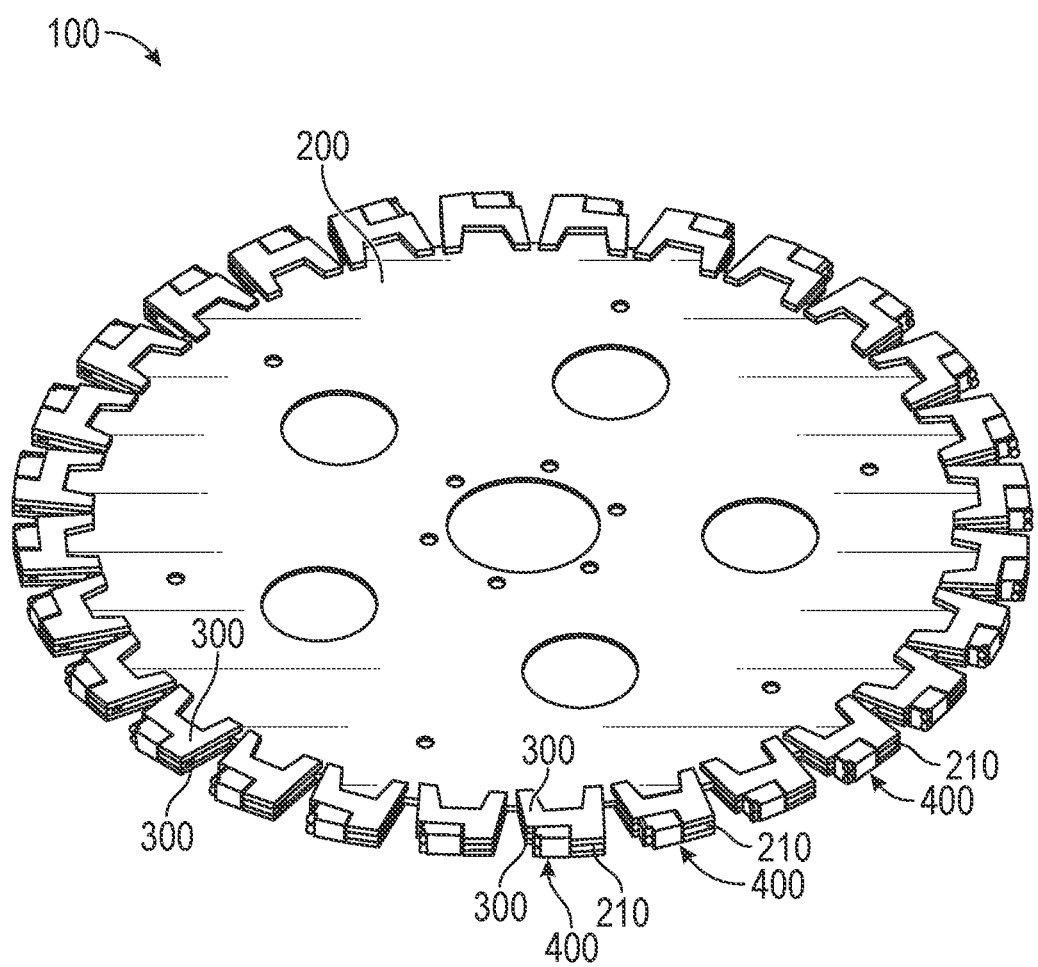
FIG. 1 is a perspective side view of a saw blade that is configured in accordance with embodiments of the present invention.

FIG. 1 is a perspective side view of a saw blade 100 that is configured in accordance with embodiments of the present invention. Saw blade 100, which may be an asphalt saw blade, includes a main body 200, a number of outer plates 300 and a number of cutters 400. More particularly, main body 200 has a circular inner shape and a number of teeth 210 that extend from a radial edge of the circular inner shape. A cutter 400 and a pair of outer plates 300 are secured to each tooth 210.

Figure 2:
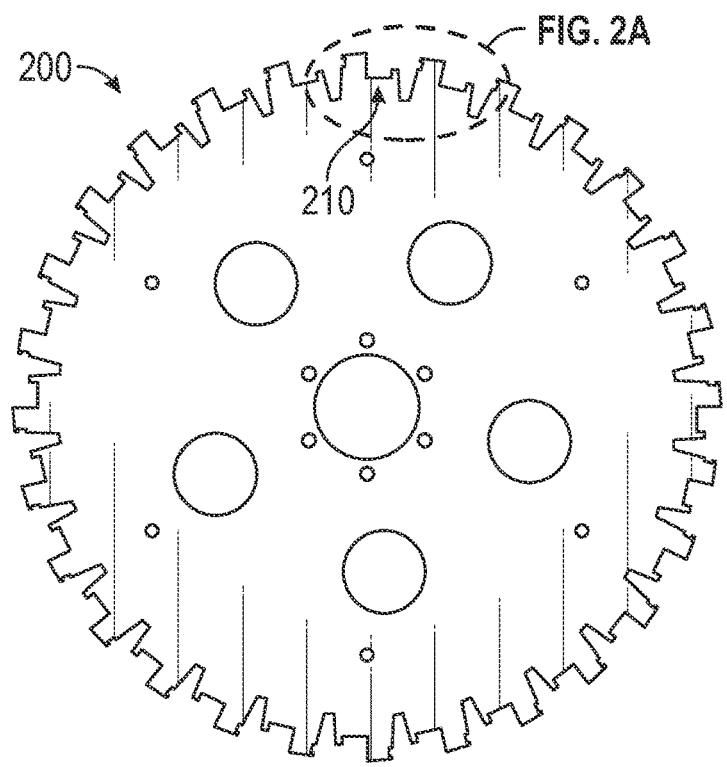
FIG. 2 is a side view of a main body of the saw blade of FIG. 1.
Figure 2A:
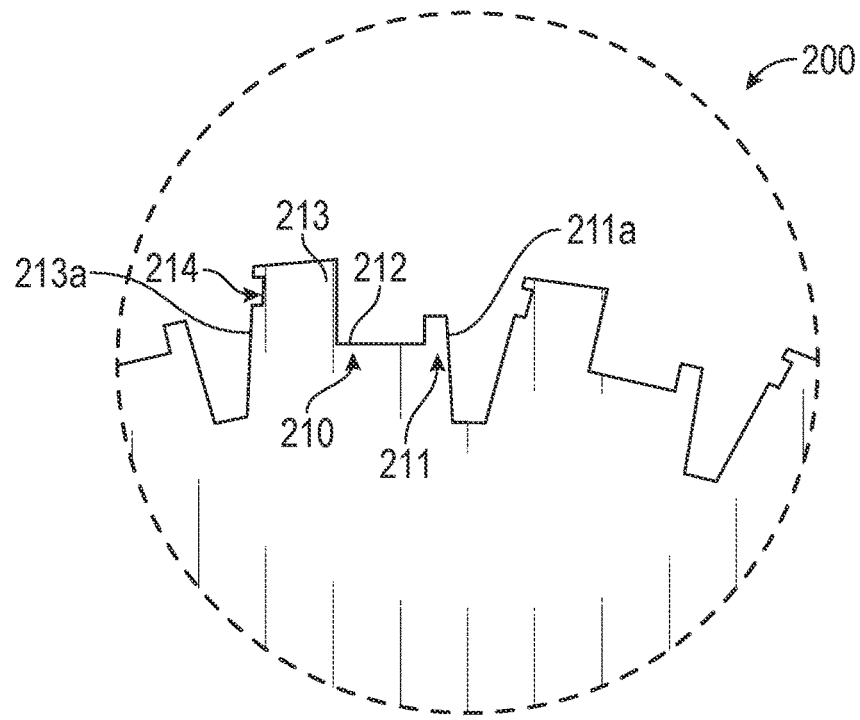
FIG. 2A is a detailed side view of the main body.

FIG. 2 is a side view of main body 200 and FIG. 2A is a detailed side view of a tooth 210. Teeth 210 are spaced around main body 200 and function as a connection point for the remaining components of saw blade 100. Each tooth 210 includes a front portion 211 forming a front face 211a of tooth 210, a middle portion 212, and a rear portion 213 forming a rear face 213a of tooth 210. Middle portion 212 extends radially from the circular inner shape of main body 200 to a lesser extent than front portion 211 and rear portion 213 and therefore forms a recessed section between front portion 211 and rear portion 213. Rear portion 213 may also extend radially to a greater extent than front portion 211. A notch 214 may be formed in rear face 213a. In some embodiments, notch 214 may be positioned at a greater radial distance from main body 200 than front portion 211.

Figure 3:
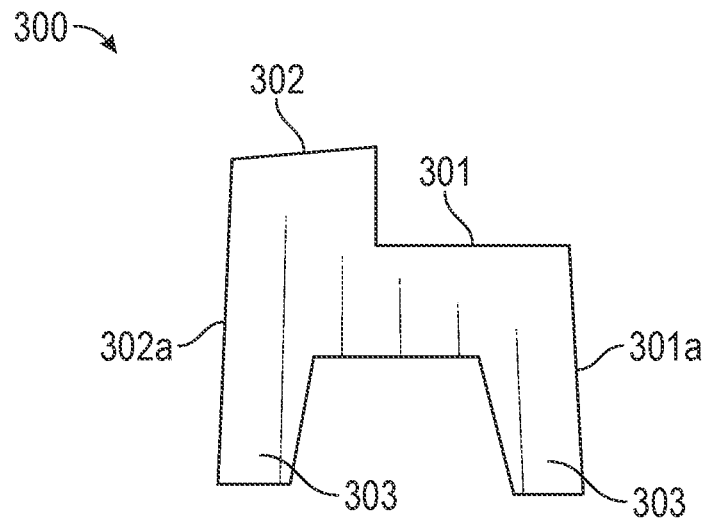
FIG. 3 is a side view of an outer plate of the saw blade of FIG. 1.

FIG. 3 is a side view of outer plate 300 in isolation. Outer plate 300 includes a front portion 301 forming a front face 301a, a rear portion 302 forming a rear face 302a, and opposing legs 303 that extend radially inward from the front and rear portions and may form extensions of front face 301a and rear face 302a.

Figure 3A:
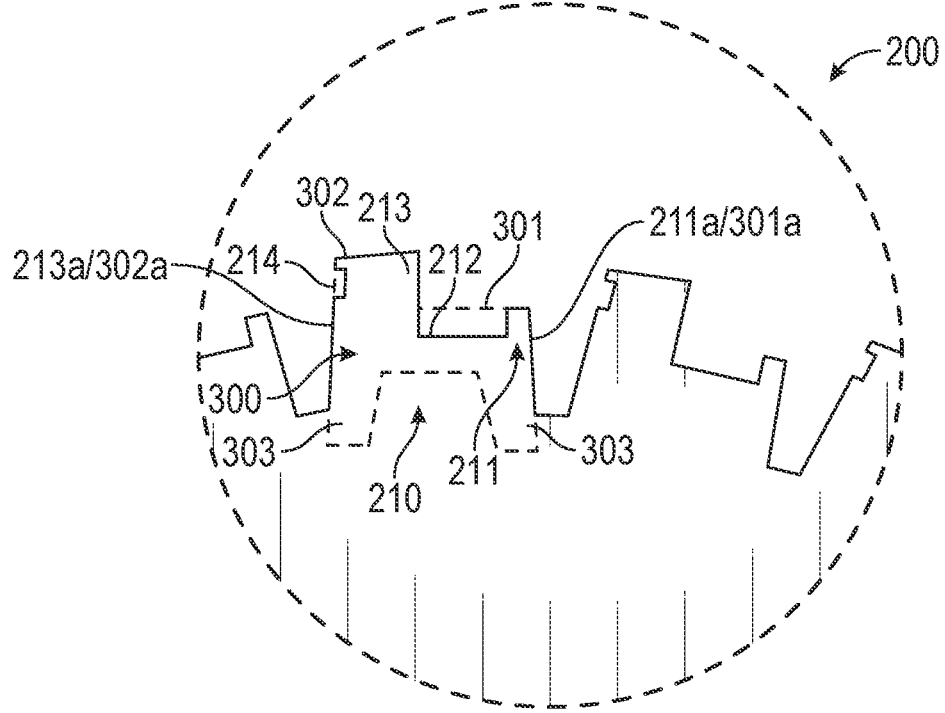
FIG. 3A is a side view of the outer plate on the main body.
Figure 4A:
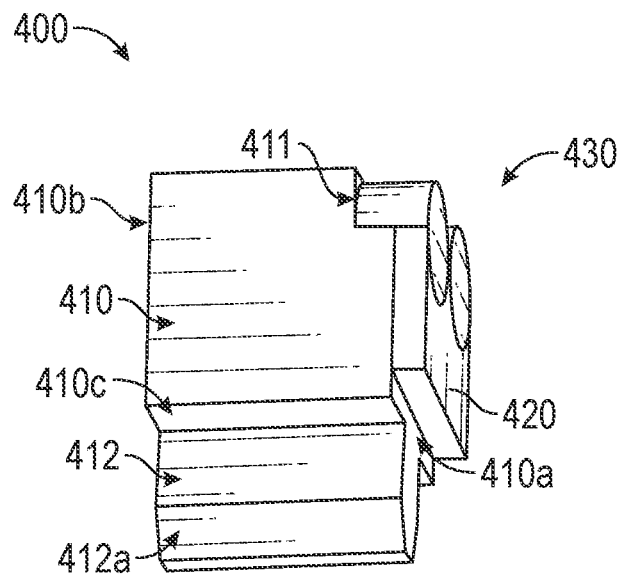
FIG. 4A is a side perspective view of a cutter of the saw blade of FIG. 1.
Figure 4B:
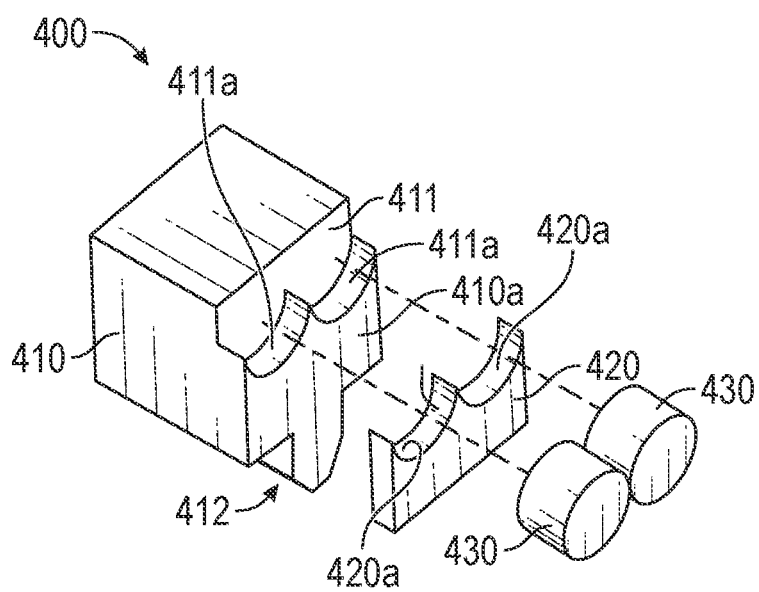
FIG. 4B is an exploded top perspective view of the cutter.
Figure 4C:
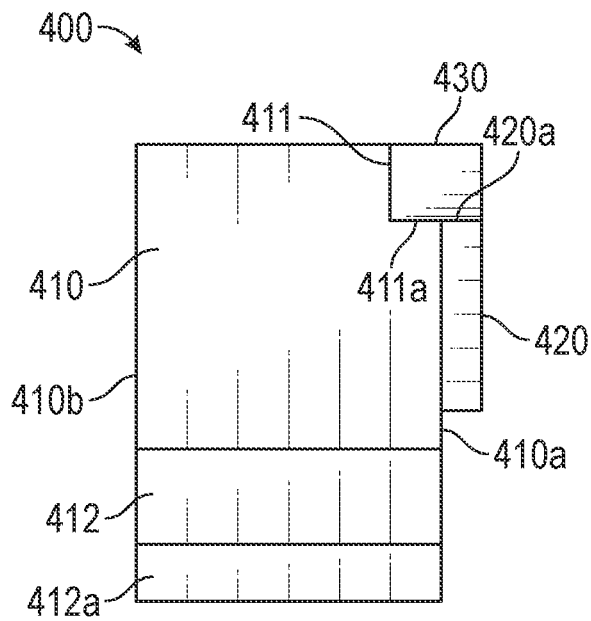
FIG. 4C is a side view of the cutter.
Figure 4D:
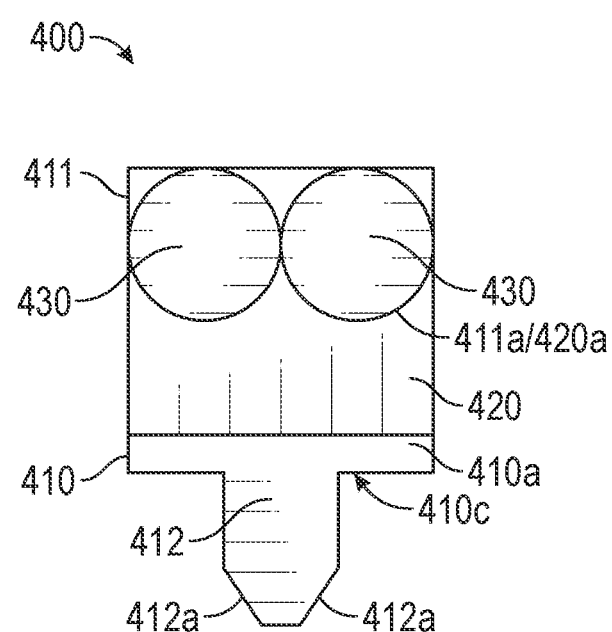
FIG. 4D is a front view of the cutter.

FIG. 3A is a side view representing an opposing pair of outer plates 300 that are positioned on a tooth 210. As shown, front face 301a of outer plates 300 may align with front face 211a of tooth 210 and rear face 302a of outer plates 300 may align with rear face 213a of tooth 210. The radial edge of front portion 301 of outer plates 300 may align with the radial edge of front portion 211 of tooth 210 and the radial edge of rear portion 302 of outer plates 300 may align with the radial edge of rear portion 213 of tooth 210, whereas the radial edge of middle portion 212 may be recessed from front portion 301. This recessed area formed between the exposed portions of the opposing pair of outer plates 300 and between front portion 211 and rear portion 213 can function to receive cutter 400 as described in further detail below. Rear face 302a of outer plates 300 may also cover the sides of notch 214. Notch 214 can allow the use of a puddle weld to enhance the coupling of outer plates 300 to tooth 210. Legs 303 extend radially inward onto main body 200 (i.e., beyond tooth 210) and may enhance the coupling of outer plates 300 to main body 200/tooth 210.

FIGS. 4A-4D are various views of cutter 400 in isolation. Cutter 400 includes a cutter main body 410 having a front face 410a, a rear face 410b, a bottom face 410c, a frontward-facing notch 411 and a base 412 that extends radially inward from bottom face 410c of cutter main body 410, a cutter plate 420 that is secured to a front face 410a of cutter main body 410 and cutting element(s) 430 that are secured (e.g., via welding) in notch 411 and to cutter plate 420. For example, notch 411 may form receiving portions 411a and cutter plate 420 may form corresponding receiving portions 420a that align with receiving portions 411a. In some embodiments, cutting elements 430 may be cylindrical and receiving portions 411a/420a may be semi-circular. A bottom of base 412 may include beveled edges 412a in some embodiments. Beveled edges 412a may enhance bonding between base 412 and outer plates 300 and between base 412 and tooth 210.

Cutter plate 420, which could be formed of a steel alloy, and cutting element(s) 430, which could be formed of polycrystalline diamond (PCD), can be coupled to cutter main body 410 in any suitable manner (e.g., via welding). Cutting elements 430 function to cut through asphalt. By employing two circular shaped cutting elements 430, the combined length of the cutting edge is maximized. However, embodiments of the present invention should not be limited to any particular number or shape of cutting elements 430.

Figure 5:
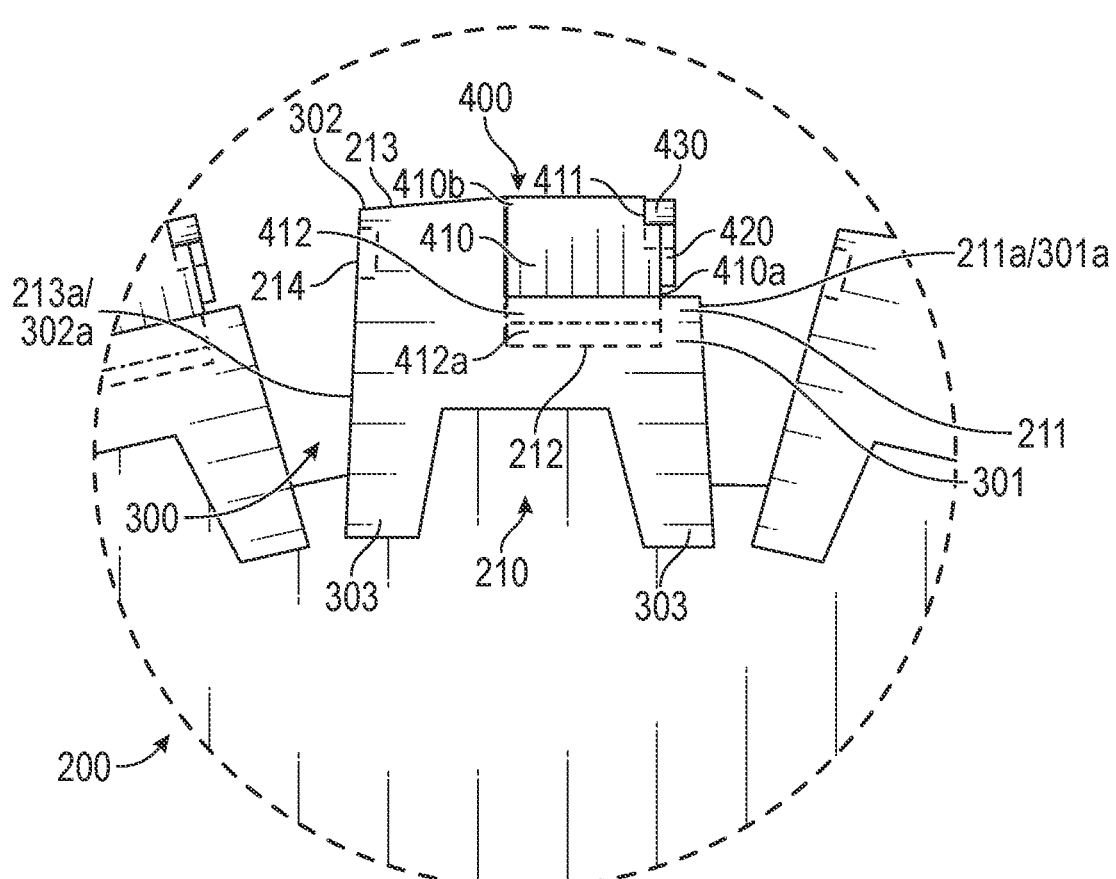
FIG. 5 is a detailed side view of the saw blade of FIG. 1.

FIG. 5 is a detailed side view of saw blade 100 showing how cutter 400 is secured to tooth 210 and opposing outer plates 300. As shown, bottom face 410c may be positioned adjacent or against the tops of outer plates 300 such that base 412 is positioned within the recessed area formed between the exposed portions of the opposing pair of outer plates 300 and between front portion 211 and rear portion 213. Rear face 410b of cutter 410 is positioned adjacent or against rear portion 213 of tooth 210 and front face 410a is positioned adjacent or against front portion 211. The sides of cutter 400 may substantially align with the sides of outer plates 300. Cutter plate 420 is positioned above and may be spaced from front portion 211. Cutting elements 430 may extend frontward overtop front portion 211. Front face 211a/301a can extend frontward beyond cutting elements 430 and cutter plate 420 to form a ledge in front of cutting elements 430 and cutter plate 420.

This design of saw blade 100 can provide various benefits including extending the life of the saw blade, improving the "clean-out performance" from an open trench, improving cutting speed, enhancing corner cutting performance, etc.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A saw blade comprising:
a main body having a plurality of teeth, each tooth having a front portion, a rear portion and a middle portion, the middle portion extending radially from a circular inner shape of the main body to a lesser extent than the front portion and the rear portion to form a recessed section;
for each tooth of the main body, opposing outer plates that are coupled to the respective tooth, the opposing outer plates extending radially beyond the middle portion of the respective tooth; and
for each tooth of the main body, a cutter that is coupled to the respective tooth and the respective opposing outer plates, the cutter comprising a cutter main body, a cutter plate, and one or more cutting elements, the cutter main body having a base that is positioned within the recessed section of the respective tooth.

2. The saw blade of claim 1, wherein the rear portion of the tooth extends radially from the circular inner shape of the main body to a greater extent than the front portion of the tooth.

3. The saw blade of claim 2, wherein a rear face of the cutter main body is positioned against the rear portion of the tooth.

4. The saw blade of claim 1, wherein the cutter plate is secured to a front face of the cutter main body, and wherein the cutter main body and the cutter plate form one or more receiving portions in which the one or more cutting elements are positioned.

5. The saw blade of claim 4, wherein the one or more cutting elements extend frontward overtop the front portion of the tooth.

6. The saw blade of claim 1, wherein the rear portion of the tooth forms a rear face of the tooth, the rear face including a notch.

7. The saw blade of claim 6, wherein the opposing outer plates cover sides of the notch in the rear face of the rear portion of the tooth.

8. The saw blade of claim 1, wherein each outer plate includes opposing legs that extend radially inward onto the main body.

9. The saw blade of claim 1, wherein the base of the cutter main body includes beveled edges.

10. The saw blade of claim 1, wherein the one or more cutting elements comprises two cutting elements.

11. The saw blade of claim 1, wherein each of the outer plates includes a front portion and a rear portion, the front portion of the outer plate having a radial edge that aligns with a radial edge of the front portion of the tooth, the rear portion of the outer plate having a radial edge that aligns with a radial edge of the rear portion of the tooth.

12. The saw blade of claim 1, wherein the front portion of the outer plate forms a front face of the outer plate that aligns with a front face of the tooth and the rear portion of the outer plate forms a rear face of the outer plate that aligns with a rear face of the tooth.

13. A saw blade comprising:
a main body having a plurality of teeth;
for each tooth of the main body, opposing outer plates that are coupled to the respective tooth, each outer plate having a front portion and a rear portion, the front portion of the outer plate forming a front face of the outer plate that aligns with a front face of the tooth, the rear portion of the outer plate forming a rear face of the outer plate that aligns with a rear face of the tooth; and
for each tooth of the main body, a cutter that is coupled to the respective tooth and the respective opposing outer plates, the cutter comprising a cutter main body, a cutter plate, and one or more cutting elements, the cutter main body being positioned against the rear portion of the opposing outer plates and being spaced rearward from the front face of the outer plates.

14. The saw blade of claim 13, wherein each of the outer plates includes opposing legs that extend radially inward from the respective tooth and onto the main body.

15. The saw blade of claim 13, wherein each tooth forms a recessed section within which a base of the respective cutter main body is positioned.

16. The saw blade of claim 15, wherein the recessed section is positioned between the opposing outer plates.

17. The saw blade of claim 16, wherein the cutter plate and the one or more cutting elements extend frontward from the cutter main body overtop the front portion of the respective outer plates.

18. A saw blade comprising:
a main body having a plurality of teeth, each tooth having a front portion, a rear portion and a middle portion;
for each tooth of the main body, opposing outer plates that are coupled to the respective tooth, each outer plate having a rear portion that aligns with the rear portion of the respective tooth; and
for each tooth of the main body, a cutter that is coupled to the respective tooth and the respective outer plates, the cutter comprising a cutter main body, a cutter plate, and one or more cutting elements;
wherein a radial edge of the cutter main body aligns with a radial edge of the rear portion of the respective tooth and with a radial edge of the rear portion of the respective outer plates.

19. The saw blade of claim 18, wherein the front portion of the main body and a front portion of each of the respective outer plates extends frontward beyond the respective cutter.

20. The saw blade of claim 18, wherein the middle portion of each tooth forms a recessed section of the respective tooth, and wherein a base of the respective cutter main body is positioned within the recessed section.

* * * * *